United States Patent [19]

Olson

[11] 4,012,061
[45] Mar. 15, 1977

[54] DUAL CONDUIT DRILL STEM MEMBER
[75] Inventor: Wallace Fred Olson, Midland, Tex.
[73] Assignee: Smith International, Inc., Midland, Tex.
[22] Filed: Dec. 23, 1974
[21] Appl. No.: 535,193
[52] U.S. Cl. .................... 285/133 A; 285/142; 285/114; 285/369; 285/417; 285/383
[51] Int. Cl.² ............................... F16L 47/00
[58] Field of Search ........... 285/133 R, 133 A, 138, 285/139, 140, 141, 142, 143, 47, 294, 381, 351, 355, 369, 114, 53, 383, 417; 175/215

[56] References Cited

UNITED STATES PATENTS

| | | | |
|---|---|---|---|
| 1,501,217 | 7/1924 | Hecter | 285/383 X |
| 2,215,659 | 9/1940 | Bacon | 285/417 X |
| 2,739,829 | 3/1956 | Pedlow et al. | 285/369 X |
| 3,266,821 | 8/1966 | Safford | 285/369 X |
| 3,441,294 | 4/1969 | Krieg | 285/369 X |
| 3,516,690 | 6/1970 | Krieg | 285/369 X |
| 3,540,536 | 11/1970 | Huszar | 175/215 X |
| 3,552,779 | 1/1971 | Henderson | 285/133 R |
| 3,563,576 | 2/1971 | Lee | 285/369 X |

Primary Examiner—Wayne L. Shedd
Attorney, Agent, or Firm—Murray Robinson; Ned L. Conley; David Alan Rose

[57] ABSTRACT

Dual conduit drill stem member includes pipe having two piece tube therewithin affixed to pipe at outer ends and inner ends coupled by composite elastomeric sleeve and telescopic metal coupling, adjacent members being connected by threaded tool joints on pipe ends and compression sealed telescopic joints on tube outer ends.

31 Claims, 6 Drawing Figures

DUAL CONDUIT DRILL STEM MEMBER

BACKGROUND OF THE INVENTION

This invention pertains to dual conduit drill stem members.

In the co-pending application of William W. Bishop entitled Dual Conduit Drill Stem Member and Connections filed concurrently herewith, the disclosure of which is incorporated herein by reference, there is described a dual conduit drill stem member upon which the present invention is an improvement. As there disclosed a dual conduit drill stem member comprises a tube radially positioned within a steel pipe by spacers axially and azimuthally spaced along the length of the tube. The ends of the tube are welded to the box and pin connectors which are provided with dual compression seals, and the ends of the pipe are provided with threaded pin and box tool joint members, for making connection with the tube and pipe of other drill stem members. The tube connectors are provided with radial fins welded thereto, the fins on each connector engaging an outwardly facing shoulder in the adjacent tool joint member and being shrink fitted within the tool joint member.

The shoulder and shrink fit engagement of each tube connector to the adjacent tool joint member is advantageous to the compression seal construction in that as the tool joint members are screwed together the tube connector seals are compressed. If the tube connectors were free to move axially relative to the tool joints, make up of the tool joints on the pipe would not effect compression of the tube connector seals, and other means, for example the weight of the tube, would have to be used to effect the desired seal compression. If only one of the tube connectors were fixed axially, the other being free, it would be possible to effect seal compression upon make up of the tool joints on the pipe by transmission of the compressive load through the tube from the free connector to the fixed connector, but the degree of compression would then vary as the pipe bent, elongated or contracted relative to the tube. Therefore, it is preferable to rigidly anchor both tube connectors to their respective tool joint members as in the construction of the aforementioned Bishop application. However, some problems may be created by anchoring both the connector to the respective tool joint members as will be explained hereinafter.

The drill stem member construction disclosed in the aforesaid Bishop application is eminently satisfactory for certain applications, such a drilling blast holes in the process of strip mining. In such use the overall length of the drill stem, which comprises several drill stem members connected together, is usually less than 100 feet. The weight of the drill stem is insufficient to properly load the drill bit and the drill stem is pushed downward by applying a portion of the weight of the drill rig to the drill stem through the swivel connection. The drill stem is therefore all operated in compression. Furthermore, the hole and bit diameter is not much larger than the pipe's tool joint diameter so that the sides of the drill stem may be supported by the hole. This is also the case in the drilling of small capacity water walls, the depth and diameter of which are small.

More severe operating conditions are encountered when deeper and larger diameter holes are drilled, as in the case of deep water wells, irrigation wells, mine shafts, underground storage chambers, and the like. A principal problem encountered is that of excessive vibration of the tube, due in large part, it is believed, to the effect of high pressure fluid passing through the drill stem. For example, the fluid may be air flowing down the annulus between pipe and tube to a level below the level of water standing in the hole being drilled and air and water flowing up the tube above that level. The vibration due to movement of such an air water mixture may be likened to the water hammer in a heating system. Other vibrations originate from the reaction of the drill bit at the bottom of the hole. Vibration, whether it be axial, torsional, or transverse, imposes excessive stress on all parts of the drill stem which may result in failure.

In the case of deep holes, the uppermost lengths of drill stem may be in tension, adequate bit weight being provided by the lower part of the drill stem, which may include drill collars. Tensioning of the drill stem places the pipe in tension and this tension is transmitted through the connection of the tool joint members and tube connectors to the tube. While this is advantageous in that the tube shares the load with the pipe, the stress due to tube tension when added to that due to vibration may cause failure. Also, the tensioning of the tube may itself increase the vibration thereof like the tensioning of the string on a musical instrument. The tube may therefore vibrate with considerable amplitude, both torsionally and transversely.

In the case of big holes, the drill stem may whip around in the hole as the pipe rotates, causing considerable bending of the pipe. In any bending situation some of the fibers are in tension and some of the fibers are in compression. Such bending stresses reverse as the pipe rotates and the direction of bending changes. These reversing bending stresses are imposed on the weld structures of the drill stem.

Both in the case of vibration and reversing bending stresses, the weld structures of the drill stem may fail due to fatique. The present improvement is directed to reduction of such failure.

SUMMARY OF THE INVENTION

According to the invention, a dual conduit drill stem member comprises a length of steel drill pipe within which is disposed a tube radially spaced therefrom by lugs axially and azimuthally spaced along the length of the tube and welded thereto. The ends of the tube are welded to box and pin connectors which are provided with dual compression seals, and the ends of the pipe are provided with pin and box rotary shouldered tool joint members, for making connection with the tube and pipe of other dual conduit drill stem members. The tube connectors are provided with centering means in the form of a set of radial fins welded thereto which fit inside the tool joints. The fins also serve as retention means, each set of fins engaging an outwardly facing shoulder in the adjacent tool joint member and being shrink fitted within the tool joint member, thereby rigidly affixing both ends of the tube to the pipe.

The tube comprises two steel portions whose adjacent ends are connected together by a special composite steel-rubber tubular coupling. The coupling is internally annularly recessed leaving an inturned annular flange at its ends. Each flange is internally straight threaded to screw onto one of the tube members. Midway along its length the coupling is divided into two halves which fit together telescopically. The two halves are held together by a rubber sleeve disposed in the annular recess and molded (vulcanized) in situ and bonded to the inner periphery of the coupling halves. During molding rubber flows into the space between the end of the innermost telescoping member of the coupling halves and the adjacent shoulder on the outermost telescoping member. The ends of the portions connected to the coupling are straight threaded, except for unthreaded tapered tips at their extremities. The tube portion ends are screwed through the coupling halves and into the rubber sleeve into abuttment. Rubber from the sleeve then flows radially into the preassembly annular space between the middle of the sleeve and the tapered tips of the tube portions.

The special coupling joining the two portions of the tube functions in a variety of ways. For one thing it serves as a hinge, allowing angularity of the tube portions, as may be required when the drill stem bends, without great stress being imposed on the connections of the ends of the tube to the ends of the tube to the tube to the ends of the pipe. Secondly, the low elastic modulus and thin wall section of the rubber or other elastomeric sleeve joining the coupling halves has such a low unit stress to unit strain ratio compared to that of the steel tube portions which it connects that the stress in the latter is kept low even though the pipe is highly stressed in tension or torsion. The tube is therefore not tightened like the string of a musical instrument when the pipe is tensioned, and this may reduce vibration. Thirdly, the lowered tension stress in the tube lowers the stress in the connections between the tube and pipe when the latter is in tension. By virtue of the foregoing, fatique failure of the connections of the tube to the pipe at both ends of the tube is greatly reduced or eliminated, while at the same time the improved sealing of dual compression seals made possible by rigidly connecting both ends of the tube to the pipe is maintained. In the latter regard, the reduced stresses help maintain the integrity of the shrink fits between the tool joints and connector fins. Fourthly, by virtue of abutting metal to metal engagement of the ends of the two portions of the tube within the special coupling, the tube can share compressive load with the pipe when the latter is in compression; this reduces the degree of bending or buckling under such circumstances. Finally, although the tube is of tripartite construction, metal to rubber to metal, it is unitary in that there are no partable connections with separable seals that need to be repeatedly made up and broken apart during use.

BRIEF DESCRIPTION OF THE DRAWINGS

For a detailed description of a preferred embodiment of the invention reference will now be made to the accompanying scale drawings wherein.

DESCRIPTION OF THE PREFERRED EMBODIMENT

Radially Spaced Conduits

Referring now to FIG. 1, there is shown a drill stem member 11 comprising an outer flow conduit or pipe 13 and an inner flow conduit or tube 15. Tube 15 is disposed within pipe 13 and is radially separated therefrom by spacer lugs 17. Lugs 17, are disposed at axially and circumferentially spaced apart locations along tube 15, as shown in detail in FIG. 2. The lugs are welded to the tube by means of welds such as at 19 extending longitudinally along each side of each lug, no circumferential welds being used. The outer corners of the lugs 17 are beveled, as at 21. The tube 15 is divided into two portions 23, 25 connected, as shown in FIG. 1, by threaded special coupling 27 (see also FIGS. 3 and 4). Tube portion 23, which is at the lower end of the drill stem member, is preferably shorter than tube portion 25, to reduce the weight of the lower tube portion 23, the desirability of which will be explained subsequently hereinafter.

Figures 2A, 2B:
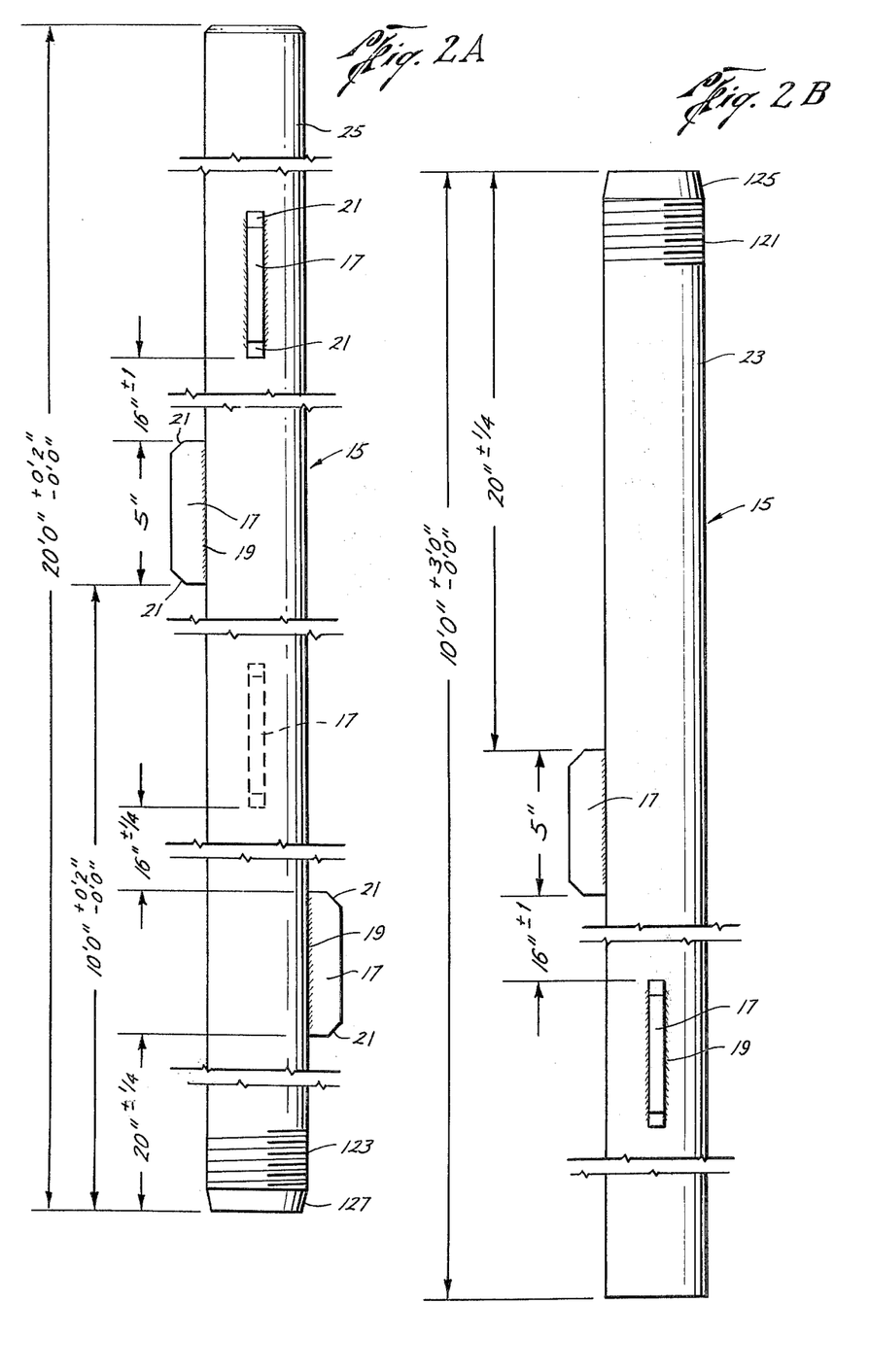
FIGS. 2A and 2B, hereinafter referred to collectively as FIG. 2, show an elevation of the tube of the drill stem shown in FIG. 1 prior to the welding of the tube connectors thereto.

As shown in FIG. 2B there are two lugs 17 disposed to 90° to each other about tube portion 23, and four more lugs helically disposed about tube portion 25 at 90° to each other as shown in FIG. 2A. The lugs 17 immediately adjacent coupling 27 are disposed at 180° to each other, measured about the tube axis. The axial spacing of the lugs 17 along the length of tube 15 is indicated in detail in FIG. 2. The radial distance from the outer periphery of each lug to the axis of the tube is substantially equal to the radial distance from the pipe axis to the inner periphery of the pipe, whereby the tube 15 is positioned coaxially with the pipe 13.

Outer Conduit Connectors

As shown in FIG. 1, one end of pipe 13 is provided with a pin tool joint member 31 and the other end of pipe 13 is provided with a box tool joint member 33. The tool joint members 31, 33 are preferably unitized with the pipe ends, e.g. by flash welding or friction welding. The box tool joint member 33 is internally tapered and threaded at 35 and counterbored at 37 at the bottom of the box providing a shrink fit area 39 increasing the box flexibility and leaving and outwardly facing internal shoulder 41. There is a stress relief groove 42 adjacent shoulder 41. The mouth 43 of the box is square providing a shoulder for engagement with a pin tool joint shoulder. Pin tool joint 31 is correlative to box tool joint 33 is provided with an externally tapered and threaded pin 45. The pin 45 is counterbored at 47 to provide an outwardly facing internal shoulder 49 and leaving a shrink fit area 48 therewithin. There is a stress relief groove 51 adjacent shoulder 49. An external outwardly facing shoulder 46 is provided adjacent pin 45 for engagement with a box tool joint shoulder. Tool joint members 31 and 33 provide means for making rotary shouldered connection with correlative tool joint members on adjacent drill stem members.

Inner Conduit Connectors

One end of tube 15 is provided with a pin tube connector 55 and the other end is provided with a box tube connector 57. Pin tube connector 55 is ferrule welded to the tube at 59. However, as described in the aforementioned Bishop application, it can be formed integrally therewith. Box tube connector 57 is tang welded to the tube at 61. It too might be formed integrally with the tube in modifications not requiring its installation after the tube has been inserted in the pipe.

Inner Conduit Retention and Centralizing Means

Pin tube connector 55 is provided with a plurality of radially extending centralizer fins 63. Notches 64 in fins 63 provide shoulders which abut tool joint shoulder 41. Fins 63 are shrink fitted within the counterbore or shrink fit area 39 of box tool joint member 33. Box tube connector 57 is provided with a plurality of radially extending centralizer fins 67. Notches 69 in the fins 67 provide shoulders which abut tool joint shoulder 49. Fins 67 are shrink fitted within the counterbore or shrink fit area 48 of pin tool joint member 31.

In the drawings only four fins 63 and four fins 67 are shown, but as described in the Bishop application six may be preferred to maintain circularity of the tool joint shrink fitted thereon and to preserve the shrink fits.

The shouldered and shrink fitted connection of each tube connector to the adjacent tool joint member is the same as that described in greater or lesser detail in the aforementioned Bishop application. In particular, inherently the shoulder is deeper and the shrink fit area is greater at the upper or box tool joint end of the drill stem member.

The present invention is adapted to this fact in that in use most of the weight of the inner tube is placed on the shrink fit area and shoulder at the upper end of the drill stem member 11 at the tool joint box end thereof. The shrink at the lower end of the drill stem member 11 between the pin tool joint member 31 and the box tube connector 57 will sustain the weight of the lower portion 23 of tube 15.

Inner Conduit Connector Seal Means

Tube connector 55 is provided with a cylindrical pin 71 having an annular groove 73 thereabout spaced axially from the flaring tip 75 of the pin 71. Tip 75 flares in the direction progressing axially from the pin tube connector 55 toward box tube connector 57. Adjacent groove 73 at the far side from tip 75 is an external outwardly facing shoulder 77. Disposed in and protruding beyond groove 73 is an elastomeric seal ring 79. The seal ring is of bullet shaped cross section. Its rectangular section base lies against shoulder 77.

Tube connector 57 is provided with a cylindrical box 81 having an annular groove 83 therewithin spaced axially from the flaring mouth 85 of the box. Mouth 85 flares in the direction progressing axially from the pin tube connector 55 toward box tube connector 57. Adjacent groove 83 at the far side from mouth 85 is an internal outwardly facing shoulder 87. Disposed in and protruding beyond groove 83 is an elastomeric seal ring 89. The seal ring if of bullet shaped cross-section. Its rectangular section base lies against shoulder 87.

Seal rings 79, 89, preferably have a durometer hardness of about 65 measured on the Shore A scale; e.g. in the range of 50–75. They are each compressed axially about ½ of their width when engaged with the end of a correlative tube connector of an adjacent tool joint member, and the adjacent tool joint member is fully made up with a correlative tool joint member of drill stem member 11, the elastomer flowing into gaps between the connector shoulders and ends to seal the same. Each connector pin is radially spaced from the inner periphery of the correlative connector box by a diametral distance of, e.g. about 0.009 inches. For further details of the dual compression seal between the tube connectors see the aforementioned Bishop application.

Inner Conduit Resilient Coupling

Figure 3:
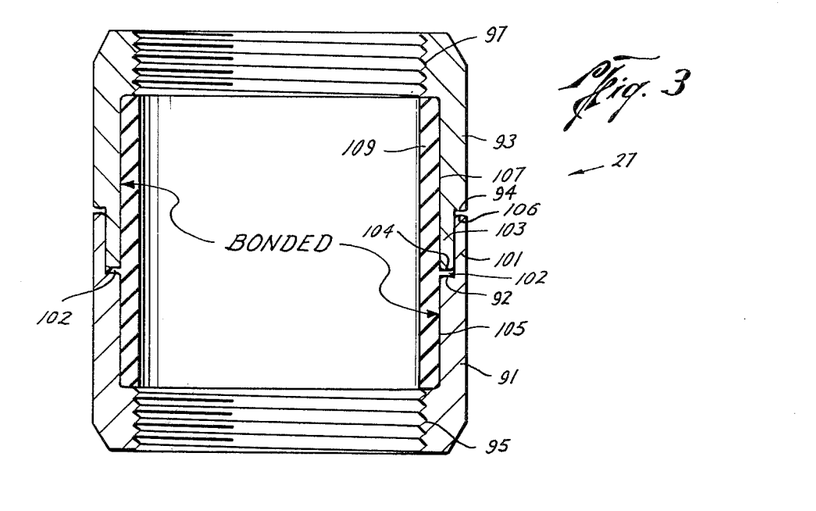
FIG. 3 is an axial section, to a larger scale, showing the special tube coupling employed in the FIG. 1 construction.
Figure 4:
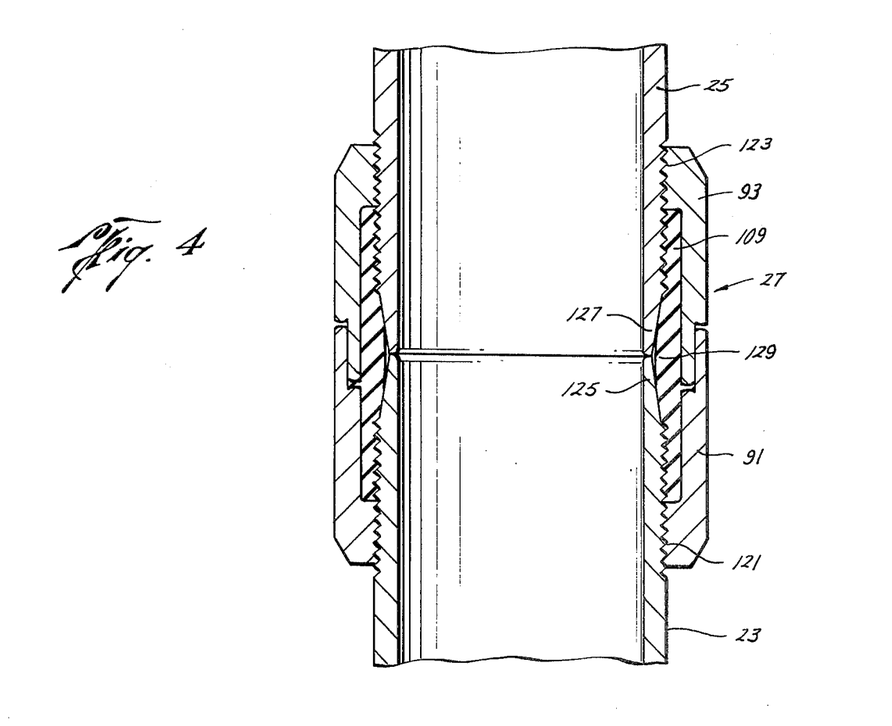
FIG. 4 is a view similar to FIG. 3 showing the tube coupling of FIG. 3 assembled with the tube portions which it connects in the construction of FIG. 1.

Reference will now be made more particularly to FIGS. 3 and 4. The tubular coupling 27, there shown, includes a split steel collar having two halves 91, 93. The outer ends of the collar halves are each threaded internally at 95, 97 respectively. The threaded ends 95, 97 are straight, cylindrical, i.e. untapered. The like threaded ends of tube portions 23, 25 are screwed into the threaded ends 95, 97 of the collar halves 91, 93. The other ends of the collar halves 91, 93 are provided with cylindrical telescoping box and pin portions 101, 103 respectively.

The pin is formed by a reduction in external diameter on the end of connector half 93, leaving a square shoulder 94. The box is formed by an enlargement in internal diameter on the end of connector half 91, leaving a square shouler at 92. The collar halves 91, 93, which are of equal outer diameter, are internally hollowed out at 105, 107 to receive sleeve 109.

Sleeve 109 is made of a material having a much lower elastic modulus than that of steel, e.g. less than 1 percent that of steel. Preferably sleeve 109 has an elastic modulus less than 10,000 lb. per sq. in. The materials known as elastomers are ideal for sleeve 109. In the preferred embodiment sleeve 109 is made of Buna "N", a synthetic rubber, having a durometer hardness on the Shore A scale of about 70, e.g. in the range of 55 to 85. In the example illustrated in FIG. 3, which is full scale, the sleeve has a thickness of about ¼ inch, e.g. 3½0.223 inches and a length of about 3 inches. The sleeve 109 is molded in situ, after applying a suitable bonding cement to the adjacent metal surfaces of the halves of the steel coupling 27. When the sleeve rubber is molded, i.e. vulcanized, some of the rubber flows into the annular space 102 between shoulder 92 and the end 104 of pin 103. There is an annular gap between shoulder 94 and the end 106 of box 101.

The outer periphery of pin 103 is in sliding but not binding contact with the inner periphery of box 101, that is, there is a close fit therebetween with very little spacing so no rubber flows between the outer periphery of the pin and the inner periphery of the box.

Referring now particularly to FIG. 4, the inner ends of tube portions 23, 25 are straight threaded at 121, 123, and the extreme tips 125, 127 are bevelled, leaving smooth conical guide areas. In assembly of drill stem member 11, the threaded ends 121, 123 of the tube portions 23, 25 are screwed into coupling 27 until their tips 125, 127 engage. They are then screwed in a little farther until the lugs 17 adjacent to coupling 27 are 180° apart as shown in FIG. 1. The tube portion tips remain in contact and the outermost fibers of sleeve 109 are slightly axially tensioned. It is desired that tips 125, 217 be in contact in order both to transmit compression and to shield sleeve 109.

The inner diameter of sleeve 109 is the same as the inner diameter of the threaded ends of the collar halves 91, 93 measured from thread crest to thread crest so that when the threaded tube ends 121, 123 are screwed into engagement they must thread their way through the sleeve 109. The rubber displaced by the threads of the tube portions 23, 25 when screwed into sleeve 109 flows into the annular volume 129 between the preassembly inner periphery of sleeve 109 and the bevelled tips 125, 127. The rubber sleeve 109 is substantially fully enclosed by the split collar 91, 93 and tube portions 23, 25 and is thus fully protected from abrasion and deterioration through contact with drilling fluid and detritus.

The composite metal and elastomer coupling 27 has sufficient strength to take considerable tensile load. The tube portions connected by the coupling will not usually be of smaller outer diameter than 1 inch, so the coupling itself will have an inner diameter of at least 1 inch. In the case of the coupling 27 for 3½ inch outer diameter tube 15 illustrated in the drawings, a tension load of up to 1000 pounds can be sustained. This is more than sufficient to support the weight (usually less than 100 pounds) of the lower portion 23 of tube 15. This is also greater than the weight of the upper portion of the tube (e.g. 200 pounds). The tube is preferably divided in a ratio of at least 3 to 1 between the lengths of the upper and lower portions, it being desirable from the vibration dampener standpoint to have the coupling somewhere near the middle, e.g. within the middle two quarters of the tubes, but from the weight standpoint it is preferred to place the coupling near the lower end of the tube. Should there be failure of the shrink fit at 43 between the lower (pin) tool joint member 31 and lower (box) tube connector 57, the coupling sleeve will retain the lower tube portion 23 until the faulty drill stem member is removed and replaced. If the coupling is used in a construction wherein the lower end of the tube is free, as in FIG. 1 of the aforementioned Garrett patent, the coupling will retain the lower half of the tube when the drill stem is racked in vertical position.

Operation

The connection provided by coupling 27 is rigid in pure compression. It displays a different character, however, with respect to bending, torsion, tension, and vibration. It can bend, twist, and elongate with the low stress, and acts to dampen both torsional and longitudinal vibrations.

While a preferred embodiment of the invention has been shown and described, modifications thereof can be made by one skilled in the art without departing from the spirit of the invention. For example, though compression seals of the type shown in the aforementioned Bishop application are preferred, other types of seal may be employed between the tube connectors, e.g. metal to metal butt seals, and sliding O-ring seals. The tube connectors could be sliding telescopic members, threaded, or tapered bell and spigot type. The pipe connectors could also be varied from the conventional tool joint for making rotary shouldered connection although it is preferred that at least one of the tubular members, pipe or tube, be connected by means for making rotary shouldered connections. Other means than shoulders and shrink fits can be used to hold the ends of the tube in place relative to the pipe. For example the radial centralizer fins on the tube connectors can be welded to the tool joints, or centralizing ported rings externally and internally threaded can be screwed to the tube and pipe. Although the invention is particularly useful for drill stem constructions in which the tube is rigidly connected to the pipe at both ends, the vibration dampening effect of the coupling should be of utility in constructions where the tube is connected to the pipe at only one end or is merely suspended in the pipe. Although it is preferred to screw the tube portions into the coupling far enough so that they contact each other, thereby to transmit compressive loads, if the tube portions are not in contact the coupling may still be of some utility. The special connector 27 is the heart of the present invention, but it too can be varied in detail. Although the invention has been described with reference to dual conduit drill pipe, the invention is also applicable to other elements of a dual conduit drill stem such as kellys and drill collars, and to drill stem having more than two fluid passages.

I claim:

1. Dual conduit drill stem member comprising:
outer and inner tubular elements disposed one about the other and separated radially providing a flow passage therebetween as well as a flow passage through the inner tubular element,
connection means at each end of the drill stem member for making connections with correlative means on adjacent drill stem members to transmit tension, torsion and compression therebetween and to provide fluid communications between the inner tubular element of the drill stem member and the inner element of the adjacent members and between the outer tubular element of the drill stem member and the outer member of the adjacent members, and
means interconnecting the inner tubular element with the outer tubular element at both ends of the inner tubular element, the inner tubular element including two portions connected together by coupling means including a portion having a lower elastic modulus than that of said two portions of the inner tubular element, said coupling means providing fluid communication and transmitting mechanical loads between said two portions of the inner tubular element,
said coupling means comprising a steel collar including two parts whose adjacent ends are telescopically connected and a rubber sleeve bonded to the interior of the collar at both parts thereof,
the two parts of the collar being threaded interiorly and the ends of the two portions of the inner tubular element connected by said coupling means being exteriorly threaded and screwed into said threaded collar parts.

2. Drill stem member according to claim 1 in which the rubber sleeve is vulcanized in situ, some of the rubber entering between said telescopically connected ends of the collar parts.

3. Drill stem member according to claim 1 in which said rubber sleeve extends radially inwardly adjacent the threaded parts of the collar and the threaded ends of the inner tubular element are screwed through the rubber sleeve to at least close proximity.

4. Drill stem member according to claim 3 in which said ends of the inner tubular element are in abutting engagement within said coupling means.

5. Drill stem according to claim 4 in which the telescoping ends of the collar are a shouldered pin and a shouldered box, the end of the pin being located at a distance axially from the box shoulder and end of the box being located at a distance from the pin shoulder.

6. Drill stem member according to claim 3 in which the threaded ends of the inner tubular element are provided with smooth and tapered tips, the annular volume between the tips and the collar receiving rubber from the sleeve displaced when said threaded ends of the inner tubular element are screwed into the sleeve.

7. Drill stem member according to claim 1 wherein said collar is interiorly recessed intermediate its ends forming inwardly extending annular flanges at the outer ends of the collar, said sleeve being disposed in said recess.

8. Drill stem member according to claim 7 wherein it is the inner periphery of said flange of each collar part that is threaded and said threaded flanges and said threaded ends of the inner tubular element are straight threaded.

9. Drill stem member according to clam 8 wherein said sleeve has an inner diameter equal to the inner diameter of said flanges measured at the crests of the threads thereon, and said threaded ends of the inner tubular element are screwed through said flanges into said rubber sleeve.

10. Drill stem according to claim 9 in which said ends of the inner tubular element abut, said sleeve being enclosed between said collar and said ends of the inner tube.

11. Dual conduit drill stem member comprising: outer and inner tubular elements disposed one about the other and separated radially providing a flow passage therebetween as well as a flow passage through the inner tubular element, connection means at each end of the drill stem member for making connections with correlative means on adjacent drill stem members to transmit tension, torsion and compression therebetween and to provide fluid communications between the inner tubular element of the drill stem member and the inner elements of the adjacent members and between the outer tubular element of the drill stem member and the outer elements of the adjacent members, and means interconnecting the inner tubular element with the outer tubular element at both ends of the inner tubular element, the inner tubular element including two portions connected together by coupling means, said coupling means and said connection means including non-sliding sealing means to maintain said flow passages separate without relative axial motion of the non-sliding sealing means and the inner tubular element at the areas of contact therebetween, said sealing means of said connection means being compression seal means and said sealing means of said coupling means being an elastomeric sleeve connected to each of said portions of said inner tubular element, said means interconnecting said tubular elements at both ends of the drill stem member including compression seal type tube connectors on the ends of the inner tubular element and tool joint members on the ends of the outer tubular element each shrink fitted about the adjacent tube connector, said elastomeric sleeve being bonded and vulcanized to collar members screwed onto the ends of the portions of the inner tubular element connected by said coupling means, said tool joint members being counterbored forming in each an outwardly facing shoulder and said tube connectors each including a shoulder means engaging the outwardly facing shoulder of the adjacent tool joint member thereby capturing said inner tubular element within said outer tubular element independently of the shrink fits of the tool joint members to said tube connectors, the tensile strength of said sleeve exceeding the weight of each of the portions of the inner tubular element connected by said coupling means.

12. Drill stem member according to cclaim 11 wherein said tool joint members including a pin tool joint member and a box tool joint member, said shoulder means in the box tool joint member being of greater radial extent than that of said pin tool joint member, said coupling means being closer to said pin tool joint member than to said box tool joint member.

13. Drill stem member according to claim 11 wherein said tool joint members are pin and box tool joint members and said tube connectors are box and pin tube connectors, the box tube connector being shrink fitted within the pin tool joint member and the pin tube connector being shrink fitted within the box tool joint member, said coupling means being closer to said box tube connector than to said pin tube connector, the ratio of the length of said portions of the inner tubular element being at least three to one.

14. Drill stem member according to claim 11 including radial spacing means secured to the inner tubular element at axially spaced and azimuthally displaced positions along the length thereof, the spacing means immediately adjacent said coupling means being azimuthally displaced by 180°.

15. Drill stem member according to claim 14 wherein the spacing means on each portion of the inner tubular element are helically displaced apart one from the other about the axis of the inner tubular element by 90°.

16. Dual conduit drill stem member inner tubular element resilient coupling comprising an elastomeric sleeve and a split collar bonded to the exterior of the sleeve, said collar being internally annularly recessed, forming inturned radial flanges at its ends, said sleeve lying in the recess between said flanges, said flanges being internally threaded and the collar being split along a parting line forming telescoping pin and box ends on the adjacent parts of the collar, said parts of the collar being relatively movable axially apart, said parts being restrained against moving axially apart by said elastomeric sleeve which is bonded to both of said parts and which stretches to allow such movement of said parts axially apart.

17. Apparatus of claim 16 wherein said flanges are straight threaded and the inner diameter of said sleeve equals the inner diameter of said flange measured at the thread crests thereof.

18. Apparatus according to claim 17 wherein said sleeve is molded and vulcanized in situ.

19. Apparatus according to claim 18 wherein the sleeve elastomer extends between the telescoping pin and box portions of the collar.

20. Apparatus according to claim 19 wherein the sleeve is Buna N rubber having a Durometer hardness on the Shore A scale of between 50 and 85.

21. Apparatus according to claim 19 wherein the coupling has a tensile strength of at least 1000 pounds and an inner diameter of at least 1 inch.

22. Apparatus according to claim 16 wherein the pin and box are shouldered, the end of the pin being located at a distance axially from the box shoulder and the end of the box being located at a distance axially from the pin shoulder.

23. Dual conduit drill stem inner tubular element comprising two parts connected together by a coupling comprising a divided collar having an elastomer sleeve bonded thereto, said collar having an internal annular recess forming inturned radial flanges at the ends of the collar, said sleeve lying within said recess between said flanges, said flanges being internally threaded and screwed onto the ends of said parts of the inner tubular member, said coupling allowing said parts to move axially apart, said parts being resiliently restrained against moving axially apart by said elastomer sleeve which is bonded to the divided collar on both sides of the line of division therebetween, the elastomer sleeve stretching when said parts of the tubular element move axially apart.

24. Apparatus according to claim 23 wherein said threads are straight threads and said sleeve extends radially inwardly alongside of said threads, said ends of said parts of the tubular member being screwed into said sleeve.

25. Apparatus according to claim 24 wherein said collar is divided to provide telescoping shouldered pin and box adjacent portions, the ends of the pin and box being located at a distance axially from said shoulders, said ends of the parts of the tubular element being in engagement.

26. Apparatus according to claim 25 wherein said sleeve is molded and vulcanized in situ and the elastomer thereof extends between said pin and box.

27. Apparatus according to claim 26 wherein the tips of said ends of the portions of the inner tubular element are conical forming an annular volume therearound into which said sleeve elastomer flows when said ends are screwed into said sleeve.

28. Dual conduit drill stem member comprising
outer and inner tubular elements disposed one about the other and separated radially providing a flow passage therebetween as well as a flow passage through the inner tubular element,
means interconnecting the inner tubular element at both ends of the inner tubular element with the outer tubular element,
shouldered tool joint means at each end of the outer tubular element of the drill stem member for making connections with correlative means on the outer tubular elements of adjacent drill stem members to transmit tension, torsion and compression therebetween and to provide fluid communication between the outer tubular element of the drill stem member and that of the outer element of the adjacent members,
telescopic connection means at each end of the inner tubular element of the drill stem member for making connections with correlative means on the outer tubular element of adjacent members and to provide fluid communication between the inner tubular element of the drill stem member and the inner elements of the adjacent members,
said telescopic connection means including compression seal means comprising a pin at one end of the tubular element and a correlative box at the other end of the tubular element with an annular compression seal ring therein, said compression seal means being cooperative with correlative means on the ends of inner tubes of adjacent drill string members to form non-sliding, compression seals sealing the ends of the inner tube to the ends of the inner tubes of adjacent drill string members,
said inner tubular element including portions connected together by extendable coupling means,
said extendable coupling means including two metal parts each affixed to one of said portions of the inner tubular element and each telescopically engaged with the part affixed to the other portion of said inner tube to form a telescopic connection between said two portions of the inner tube,
said extendable coupling means including a resilient sleeve spanning the juncture of said two metal parts that form said telescopic connection connected at each end to one of said parts to form a non-sliding seal for said telescopic connection,
said extendable coupling means allowing relatively low stress extension of said inner tubular element when relatively higher axial tension stress is imposed on said outer tubular element so that the ends of said inner tubular element can be fixed to the ends of said outer tubular elements, as aforesaid, to accurately axially position the ends of said inner tube and the compression seal means thereat when said shouldered tool joint means are made up, whereby nonsliding seal means can be used at all points of telescopic connection of said inner tubular element, both at its ends where it is connected to the ends of the inner tubes of adjacent drill string members and at the telescopic connection between said two portions of said inner tubular element, said non-sliding seal means being supported by such telescopic connections.

29. Dual conduit drill stem member according to claim 28 wherein said two part telescopic connection form a housing symmetrically totally enclosing said elastomeric sleeve.

30. Dual conduit drill stem member according to claim 28 in which said two portions of the inner tubular element are made of steel and the resilient sleeve portion of said extendable coupling means has an elastic modulus less than 10,000 lb. per sq. inch.

31. Drill stem member according to claim 28 in which said sleeve is elastomeric and is bonded to the interior of the two metal parts of the extendable coupling means.

* * * * *

UNITED STATES PATENT AND TRADEMARK OFFICE
CERTIFICATE OF CORRECTION

PATENT NO. : 4,012,061
DATED : MARCH 15, 1977
INVENTOR(S) : WALLACE FRED OLSON

Figures 1A, 1B:
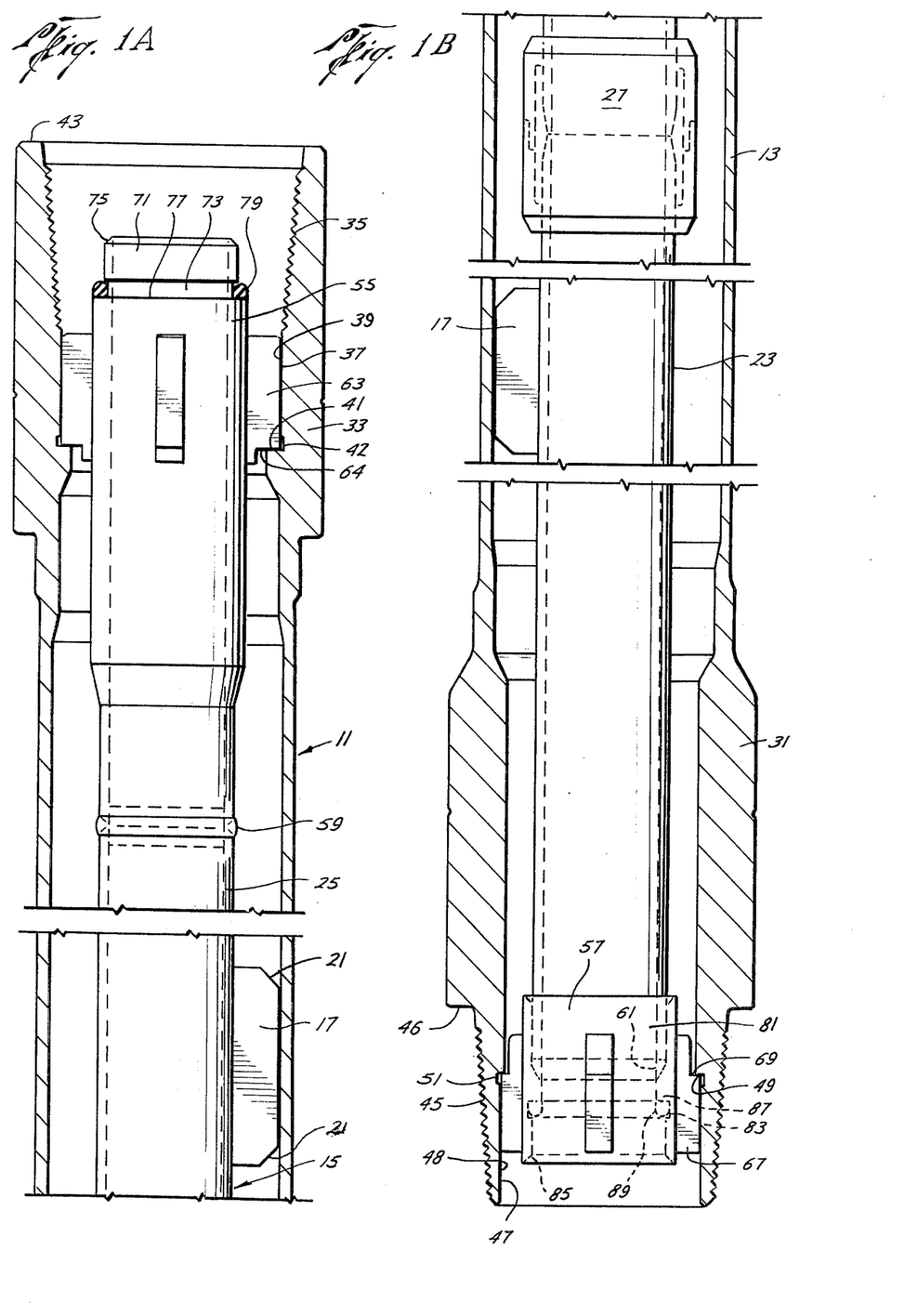
FIGS. 1A and 1B, hereinafter referred to collectively as FIG. 1, show an axial section through a drill stem member embodying the invention.

It is certified that error appears in the above-identified patent and that said Letters Patent are hereby corrected as shown below:

In the drawing, in FIGURE 1B, relocate the lead line for reference number 48 to terminate on that part of bore 47 which is shrink fitted about fins 67, as shown below.

UNITED STATES PATENT AND TRADEMARK OFFICE
CERTIFICATE OF CORRECTION

PATENT NO. : 4,012,061
DATED : March 15, 1977
INVENTOR(S) : Wallas Fred Olson

It is certified that error appears in the above-identified patent and that said Letters Patent are hereby corrected as shown below:

Column 1, line 51, change "a" to -as-.

Column 2, line 39, change "fatique" to -fatique-.

Column 2, line 63, delete "an".

Column 3, line 33, change "fatique" to -fatique-.

Column 6, line 35, change "3 1/2 0.223" to -0.223-, and change "3 inches" to -3 1/2 inches-.

Column 1, line 64, change "walls" to -wells-.

Column 2, line 64, change "flange" to -flanges-.

Column 3, line 19, after the first occurrence of "tube" delete "to the ends of tube to the".

UNITED STATES PATENT AND TRADEMARK OFFICE
CERTIFICATE OF CORRECTION

PATENT NO. : 4,012,061

DATED : March 15, 1977

INVENTOR(S) : Wallace Fred Olson

It is certified that error appears in the above-identified patent and that said Letters Patent are hereby corrected as shown below:

Column 3, line 20, delete "tube".

Column 4, line 51, after "33" insert -and-.

Column 5, line 56, change "of" to -is-.

Signed and Sealed this

Eighteenth Day of April 1978

[SEAL]

Attest:

RUTH C. MASON
Attesting Officer

LUTRELLE F. PARKER
Acting Commissioner of Patents and Trademarks